Oct. 20, 1953
S. A. WILSON
2,656,006
EMULSION TREATER
Filed July 28, 1947
3 Sheets-Sheet 1
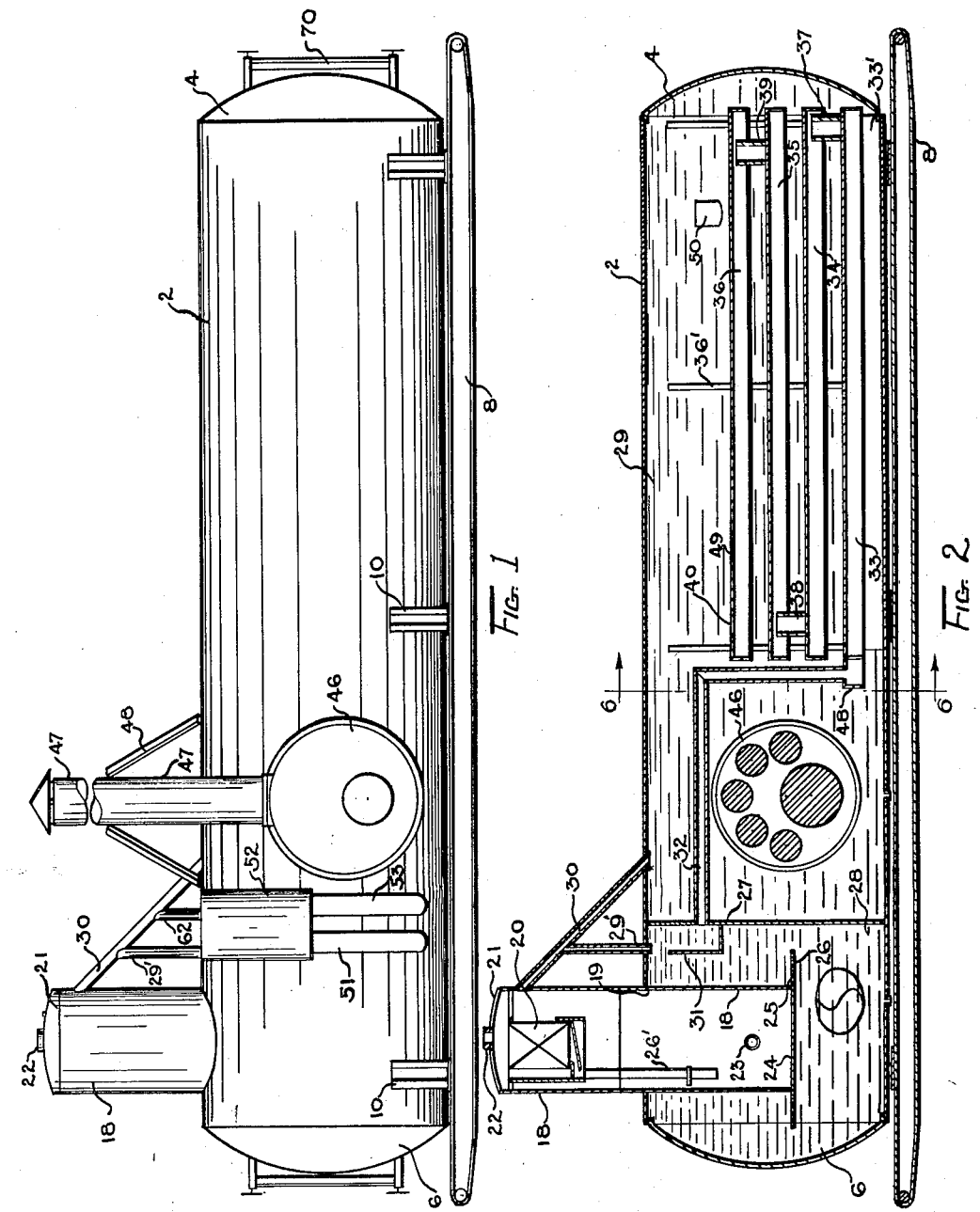
INVENTOR.
S. A. WILSON
BY C. M. McKnight Oct. 20, 1953　　　　　S. A. WILSON　　　　　2,656,006
EMULSION TREATER
Filed July 28, 1947　　　　　　　　　　　　3 Sheets-Sheet 2
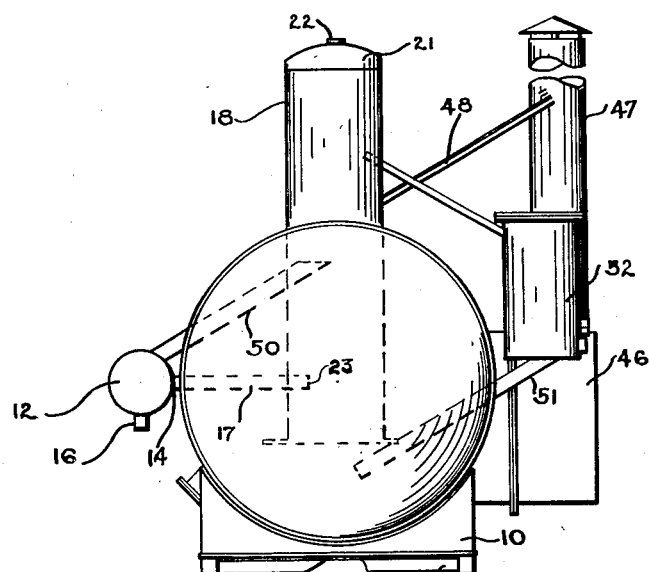
Fig. 3
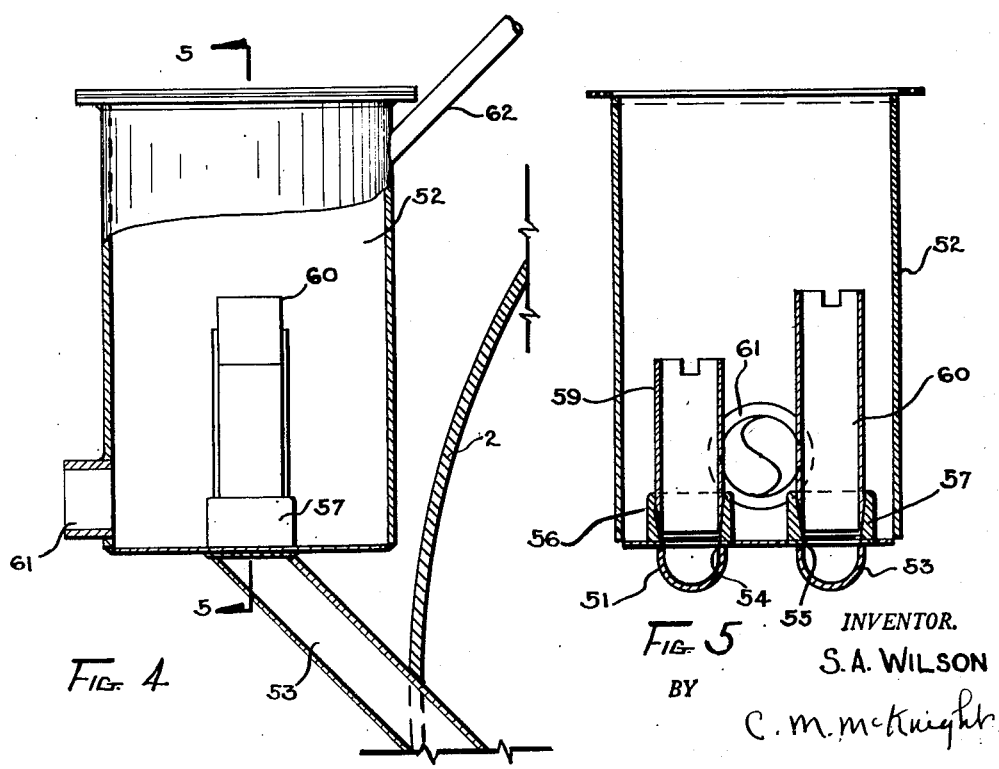
Fig. 4
Fig. 5
INVENTOR.
S. A. WILSON
BY
C. M. McKnight Oct. 20, 1953 S. A. WILSON 2,656,006
EMULSION TREATER
Filed July 28, 1947 3 Sheets-Sheet 3

INVENTOR.
S. A. WILSON
BY
C. M. McKnight

Patented Oct. 20, 1953

2,656,006

UNITED STATES PATENT OFFICE 2,656,006

EMULSION TREATER

Samuel A. Wilson, Tulsa, Okla., assignor to Maloney-Crawford Tank & Manufacturing Company, Tulsa, Okla., a corporation of Delaware Application July 28, 1947, Serial No. 764,136

6 Claims. (Cl. 183—2.7)

This invention relates to improvements in the treatment of oil, gas and water emulsions and more particularly, but not by way of limitation, to the treatment of immiscible fluids from oil wells.

The oil and gas produced from most production stratas are usually filled with salt water which becomes intermixed with the oil and gas to provide an emulsion of oil, gas and water. The presence of the salt water in the production of oil and gas necessarily requires treatment of the emulsion to separate the emulsion coming from the well into the individual constituents.

The present invention is generally concerned with the treatment of oil, gas and water emulsions by the use of a horizontally disposed treater which provides for a longer travel and scrubbing action of the emulsion through a series of inverted trays disposed in a heated chamber for efficiently and expeditiously breaking up the emulsions, and particularly emulsions that cannot be separated by the usual and conventional treaters utilized today.

It is an important object of this invention to provide an improved method and means of separating fluids and liquids of various grades and types of emulsion flowing from oil wells wherein the emulsion is subjected to a considerably longer travel in its flow through the treater to assure a complete scrubbing action for breaking up of the emulsion.

And still another object of this invention is to provide an improved means for treating and separating emulsions of various types flowing from oil wells wherein the emulsion is subjected to a primary step for separating the free-water, and then is directed in its flow through a series of inverted superimposed spaced trays to provide a longer scrubbing action in the separation of the clean oil therefrom.

And still another object of this invention is to provide a horizontally disposed treater for oil, water and gas emulsions flowing from oil wells that is readily portable by mounting on a truck, and which decreases considerably set-up time by elimination of upending or vertical disposition of the treater.

An additional object of this invention is to provide a horizontally disposed treater for oil well emulsions which is readily accessible to the operators, thereby saving considerable labor in servicing and maintenance as well as hook-up time and repair.

And another object of this invention is to provide a horizontally disposed treater for oil well emulsions which is easy to insulate and thereby provide proper covering in cold weather.

And still another object of this invention is to provide a horizontally disposed treater for oil well emulsions which is economical to manufacture, durable and efficient in its operation, and wherein control apparatus provides for the proper oil-water interface in the primary and secondary stages of separation at all times.

And still another object of this invention is to provide an improved method and means for treating and separating the emulsion of various types flowing from oil wells wherein the separated oil is stabilized to obtain the highest gravity possible under conditions of heating and washing through a prolonged travel.

And still another object of this invention is to provide a horizontally disposed treater for oil well emulsions wherein the oil-water interface is controlled in order to maintain a proper relationship between the oil-water interface at all times.

Other objects and advantages of the invention will be evident from the following detailed description read in conjunction with the accompanying drawings which illustrate my invention.

In the drawings:

Figure 1 is an elevational view from one side of the treater constructed in accordance with the preferred embodiment of the invention.

Figure 2 is a vertical sectional view of the treater shown in Figure 1.

Figure 3 is an end elevational view.

Figure 4 is an elevational view taken from one side of the siphon box.

Figure 5 is a sectional elevational view taken on lines 5—5 of Figure 4.

Figure 6:
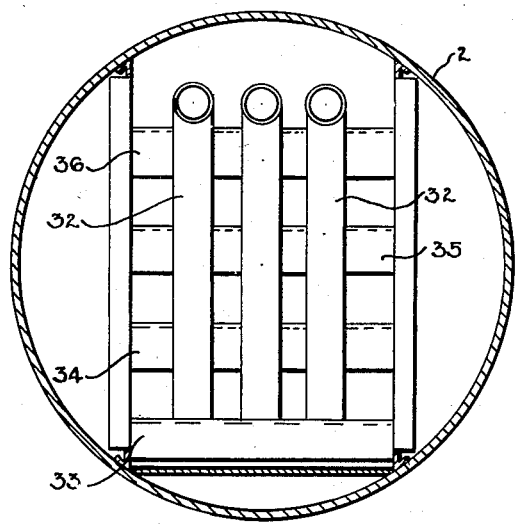
Figure 6 is a sectional view taken on lines 6—6 of Figure 2.

Referring to the drawings in detail, reference character 2 designates a cylindrical tank having dome shaped closure end members 4 and 6 respectively. The cylindrical tank 2 is adapted to be horizontally disposed on a skid member 8. The tank 2 is supported on the skid 8 by a plurality of curved support members 10 secured to the skid 8. As clearly shown in Figure 3, a heat exchanger 12 is horizontally disposed adjacent one side of the shell 2. The exchanger 12 is maintained in position through welded brackets 14. An inlet conduit 16 for the input of oil, water and gas emulsion coming from the well communicates with the exchanger. The exchanger can be of any suitable type causing flow through one side of the heat exchanger, and then reversing itself (not shown) in a counterflow charged from the heat exchanger 12 into an outlet conduit 17 communicating with a cylindrical tank or flume 18 vertically disposed in relationship to the horizontal shell 2. As clearly shown in Figure 2 the tank member 18 extends through an aperture 19 of the shell 2 and is partially disposed in the interior of the shell 2. The upper portion of the tank 18 extends above and exteriorly of the shell 2. A mist extractor 20 is disposed in the upper portion of the tank 18. The dome 21 of the tank or flume 18 is provided with a gas outlet 22, as will be hereinafter referred to. The emulsion of oil, gas and water discharging from the heat exchanger 12, and through the conduit 17 flows from the open end 23 of conduit 17 and into the vertical tank 18 at a point substantially below the surface of the emulsion present in a chamber 28.

The influent discharging into the flume 18 will flow downward into the free-water knock-out compartment 28 to immediately extract the free-water therefrom. The gas entrained in the influent mixture and discharging into the flume therewith, due to its lighter density will rise through and above the emulsion mixture, and flow into the mist extractor 20 disposed in the upper portion of the flume 18. The gas flowing upward into the extractor 20 will be stripped of its liquid constituents, which are permitted to flow downward through pipe 26' back into the influent emulsion. The separated lighter constitutents will pass off through the gas outlets 22. The disposition of the inlet pipe 17 and the open end 23 is such as to permit the separation of the free-water prior to the separation of the gas from the emulsion mixture. The gaseous vapors rising through the emulsion mixture in flume 18 will have a tendency to be stripped of their liquid constituents through contact of the gaseous vapors rising upward through liquids at a very slow velocity.

The oil and water emulsion spilling or discharging from the conduit 17 into the flume 18 flows downward to pass out the open lower end 24 thereof. The tank 18, at its lower end, is provided with a circumferential flange 25, preferably provided with a plurality of perforations 26.

As clearly shown in Figure 2, the horizontally disposed shell 2 is provided with a baffle plate 27 welded to the inner periphery and providing the chamber 28 at one end of the tank baffled or separated from a larger chamber 29, as will be hereinafter referred to. The chamber 28 is preferably known as the free-water chamber, in that the emulsion spilling from the flume 18 will deposit all free-water included therewith, and will flow upward through and around the perforated flange 25 into the upper half portion of the chamber 28. Any lighter gas bubbles in the oil and water emulsion will rise to the surface and break out of the emulsion and discharge through a conduit 29' communicating with a conduit 30 in turn communicating with the tank or flume 18 for directing the flow of the gas bubbles into the mist extractor 20 therein. It will thus be apparent that the separated gases in the emulsion in the chamber 28 are discharged directly to the mist extractor 20.

A weir box 31 is secured to one side of the baffle plate 27 at a point in the upper portion of the chamber 28. The weir box 31 is open at the top to permit the spilling or discharge of the oil and water emulsion in the chamber 28 into the box 31. The weir box 31 communicates with a plurality of conduits 32 extending through the baffle plate 27. As clearly shown in Figure 6, three conduits 32 are preferably utilized, but it is to be understood that the invention is not limited thereto. The conduits 32 provide communication from the lower portion of the box 31, and a lower tray member 33 disposed in the chamber 29 of the horizontally disposed shell 2. The tray member 33 is disposed adjacent the bottom of the tank 2 but is supported in spaced relation thereto by end brackets 33'.

Referring to Figures 2, 6, 7 and 8, it will be apparent that the tray section in the shell 2 comprises a plurality or series of trays 34, 35 and 36 disposed above the lower tray 33 and in vertical spaced relation to each other. The trays are interconnected with each other by supporting bars 36' and 33 communicates with an immediately upper tray 34 through a conduit 37, and tray 34 communicates with an immediately upper tray 35 through conduit 38, while tray 35 communicates with a tray 36 through conduit 39. An outlet passageway 40 on the top-most tray 36 communicates with the chamber 29.

Figure 7:
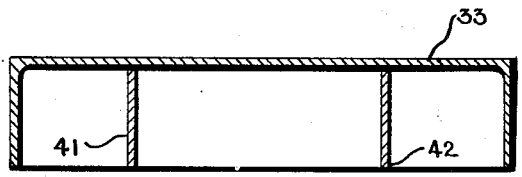
Figure 7 is a sectional view taken on lines 7—7 of Figure 8.
Figure 8:
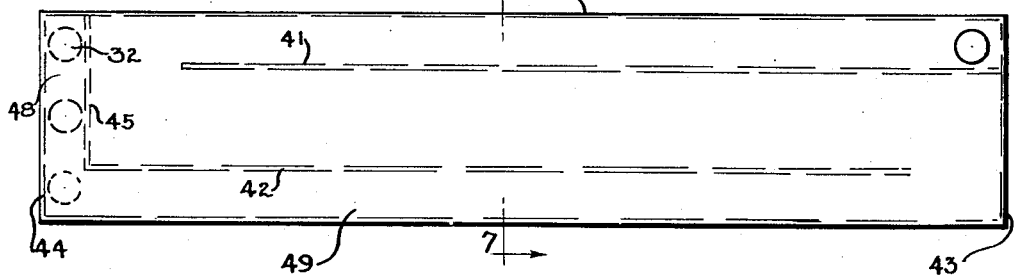
Figure 8 is a plan view of the trays shown in Figure 2.

Referring to Figures 7 and 8, it will be noted that each of the trays comprises a substantially rectangularly shaped body portion disposed in the shell 2 in an inverted position, as shown in Figure 7. Each of the tray members is provided with longitudinally extending baffle plates 41 and 42. The baffle 41 is secured to an end 43 of the tray while baffle 42 is secured to a partially transverse baffle member 45 arranged in spaced relation to the end portion 44 of the tray. Furthermore, the baffle plates 41 and 42 do not extend the complete length of the tray, but are terminated adjacent the opposite end portions to provide a passageway for reversing the flow of the emulsion therethrough, as will be hereinafter set forth. The present invention discloses only four trays, but it will be understood that it is not limited thereto, and any number of trays dependent upon the size and diameter of the tank 2 may be utilized if desired.

As clearly shown in Figures 1 and 2, the shell 2 is provided with a furnace or heater 46 disposed transversely in the chamber 29 of the shell 2. The heater 46 may utilize either gas or oil for applying heat to the chamber 29. A vertical flue member 47 extends from the heater 46. The flue member is supported by brackets 48 welded to the shell 2. The transverse disposition of the heater 46 is in proximity of the baffle plate 27, however, the heat from the furnace maintains the water in the chamber 29 at a substantially even or constant temperature throughout the chamber due to a thermo-syphonic action created by a flow of the emulsion through the series of super-imposed spaced trays, as will be hereinafter set forth.

The oil and water emulsion flows from the weir box 31 through the conduits 32 into the chamber 48 of the lower tray 33 and hence through one side of the inverted tray where the direction of flow is reversed by the baffle 42, permitting a counter-flow until it is again reversed by the baffle 41. The emulsion is then discharged through the outlet conduit 37 to an immediately upper tray 34 where the operation is repeated through the series of super-imposed spaced trays. The emulsion after passing through the series of trays is discharged through an outlet 40. During the flow of the emulsion through the series of trays, it is broken up, due to the scrubbing action of the long travel, and the application of heat from the furnace 46 to the salt water in the chamber 29. As is well known, the usual oil and water emulsion comprises a plurality of globules of salt water entrained in films of oil. The long travel of the emulsion plus the application of the heat from the furnace 46 causes the entrained salt water in the globules to distort, thereby breaking up the emulsion. This reaction is also activated by the fact that the application of heat will reduce the surface tension of the oil film to assist in breaking up of the emulsion as is well known in the treating of emulsion of this type. During the travel of the emulsion through the series of trays, the water breaking out therefrom is discharged from an inverted tray onto the top of the immediate lower tray, and into the chamber 29. It will be apparent that water breaking out of the emulsion is precluded from again coming in contact with the emulsion travel, due to the inverted disposition of the trays providing the flat top portion 49 as clearly shown in Figures 2 and 8. The oil broken from the emulsion globules will continue to travel therewith, and is discharged from the outlet 40 as substantially clean oil. The oil from outlet 40 is disposed above the topmost tray 36 and is permitted to discharge through the outlet conduit 50. The conduit 50 is disposed transversely in the tank 2 at an angle to the horizontal (Figure 3) and communicates with the heat exchanger 12 (Fig. 3) in order that the heated clean oil flowing from the shell 2 to the heat exchanger may be utilized for heating emulsion from the well, and at the same time cool the outlet oil from the treater. The clean oil passes from the heat exchanger to an outlet pipe (not shown) to disposal such as a tank farm.

The pre-heating of the incoming emulsion has the advantage of assisting in the removal of the free-water therefrom, as the emulsion discharges from the flume 18 into the free-water knock-out compartment in the lowermost portion of chamber 28. Furthermore, the cooling of the clean oil in the outgoing stream prevents evaporation losses in the storage tanks.

The amount of free-water in the lower portion of the chamber 28 is controlled by the amount or layer of the oil and water emulsion disposed thereupon, as the oil and water emulsion discharges from the chamber 18 and through the perforated flange 25. The pressure of the oil and water emulsion against the lower layer of free-water causes the free-water to discharge through a pipe 51 communicating between the shell 2 and a siphon box 52, Figure 3. The siphon box comprises a cylindrical tank member 52, vertically disposed at one side of the cylindrical tank 2, and supported in one instance by the conduit 51. The pipe 51 is welded at its entrance to the shell 2 for maintaining the box 52 in the substantially vertical upright position. The box 52 is disposed exteriorly of the shell 2 in a line substantially parallel to that of the baffle plate 27 so that the conduit 51 provides communication between the box 52 and the chamber 28, as clearly shown in Figure 3. A similar pipe or conduit 53 assists in supporting the box 52, and also provides communication between the box 52 and the chamber 29 on the opposite of the baffle plate 27 (Fig. 1). The bottom portion of the siphon box 52 is provided with a plurality of apertures 54 and 55 around which are welded threaded couplings 56 and 57 in communication with the pipes 51 and 53 respectively. A short nipple 59 is adapted to be received in the coupling 56, while a longer nipple 60 is threaded into the coupling 57. Free-water in the chamber 28 flows through the pipe 51 and nipple 59 into the box 52, while in similar manner the scrubbing water broken from the emulsion in chamber 29 is caused to flow through the connecting conduit 53 and nipple 60 into the siphon box 52. An outlet aperture 61 permits discharge of the water flowing into the siphon box to any conventional disposal means (not shown).

The length of the nipples 59 and 60 is important in controlling the height of the oil emulsion being treated in the shell 2 and particularly in the chambers 28 and 29. A proper oil-water interface must be maintained in the chamber 29 through the complete travel of the emulsion in the series of trays, and particularly to the top of the uppermost tray 36. The height of the nipple 60 of a pre-determined length determines this in the following manner: It will be apparent that if the height of the nipple 60 were decreased it would change the hydrostatic head in the chamber 29 and thereby lower the oil-water interface to decrease the emulsion travel in the top tray 36. In such a condition the top tray 36 would contain substantially clean oil broken from the emulsion and would not include any salt water necessary in the scrubbing action in the travel through the top tray 36. Similarly any decrease in height or length of the nipple 59 would lower the emulsion and free-water interface in chamber 28 to decrease the salt water scrubbing action in the free-water knockout compartment, thereby substantially lessening the reaction of the free-water removal from the flume 18.

As the scrubbed and clean oil broken from the emulsion passes from the upper outlet 40, the lighter gases that may be in solution will break out and rise to the surface, and hence flow from the shell 2 through the outlet conduit 39 providing communication through the shell and the flume 18. This gas from the clean oil is usually at high temperature and upon reaching the cool mist extractor will condense and cause any trapped oil therein to fall by gravity into the emulsion flowing from the open end of the pipe 23 in the flume 18. The upper portion of the siphon box 52 is connected with a pipe 62 which in turn connects with the equalizing pipe 30 communicating with the oil and gas separator tank 18. The conduit 62 precludes any siphonic action on the water discharging from the outlet 61 by equalizing the pressure between the box 52 with that on the inside of the shell 2. It will be apparent that it is necessary to equalize these pressures, otherwise a siphonic action would be created which would cause a substantial discharge of all the water from the outlet 61 and stop the operation of the treater. Similarly the conduit 39 equalizes the pressure between the chamber 29 and the shell 2 and the upper portion of the flume 18 containing the mist extractor 29 in order that the flow of gas and liquids between these chambers will be maintained.

As clearly shown in Figure 2, the emulsion is stratified in both chambers 28 and 29 wherein the heavier dash lines in the lower portion of the chambers represent the extracted water, and the medium dash lines represent the oil and water emulsion disposed thereabove, while the lighter dash lines in the upper part of the chambers represent the gaseous vapors liberated from and rising above the emulsion. The scrubbing water in the chamber 29 is usually accumulated from the flow of the emulsion from the weir box; however, it will be apparent that the scrubbing water may be either accumulated or disposed therein, as desired. The heat from the furnace 46 increases the temperature of the scrubbing water in proximity of the furnace, causing it to rise, and consequently the water at a lower temperature in proximity of the tank end 6 will displace the rising water and create a substantial thermosyphonic flow in the chamber 29.

The thermo-syphonic action is not created by any recirculation of the precipitated water in the chamber 29, but is due mainly to the disposition of the heater 46 at one end of the chamber 29.

Figure 9:
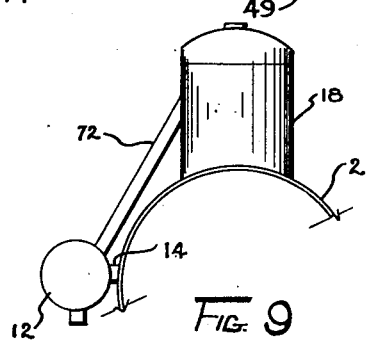
Figure 9 is a detailed view showing a modified inlet for the emulsion.

In Figure 9 is shown a modified form of the invention wherein the inlet pipe 72 is disposed in such a manner as to provide communication from the exchanger 12 to an upper portion of the flume 18. The inlet 72, at its outlet end (not shown) is disposed immediately below the mist extractor 20. In this manner the free gases or lighter gaseous vapors in the influent emulsion mixture discharging into the flume 18 are primarily liberated and permitted to flow upward into the mist extractor 20, where the heavier constituents thereof are stripped and permitted to flow back into the emulsion through the conduit 26'.

From the foregoing, it will be apparent that the present invention provides a method and apparatus for the treatment of oil, gas and water emulsions, wherein the emulsion mixture is provided with a prolonged travel through a series of horizontally disposed trays arranged in an elongated scrubbing chamber of a horizontally disposed shell member. The prolonged travel through the elongated horizontal path will effect a breaking up of oil, water and gas emulsions in a more efficient and positive manner, and particularly emulsions which are normally difficult to break up. The emulsion mixture flows in the prolonged horizontal path, and the precipitated water extracted therefrom is baffled off or precluded from coming in contact with the flowing emulsion, once it is extracted. Furthermore, the present invention contemplates a novel control apparatus communicating with both the free-water and the scrubbing chambers, in order to maintain a proper oil-water interface relationship in both the chambers at all times. The lighter gaseous constituents rising from the stratified oil in the free-water chamber, or from the clean oil in the scrubbing chamber are permitted to flow directly to the upper portion of the flume and into direct contact with the mist extractor without passage through any other chamber.

Changes may be made in the specifications and drawings without departing from the spirit of the invention within the scope of the following claims, as set forth.

What I claim is:

1. In an emulsion treating apparatus comprising a horizontally disposed shell having a plurality of separate chambers therein comprising a free water extraction chamber and an elongated scrubbing chamber, said scrubbing chamber being disposed horizontally, a vertically disposed flume mounted on the shell and having an open lower end communicating with the interior of the extraction chamber, gas separating means in the flume, an influent inlet disposed below the separating means, means for directing the influent downwardly through the flume to be discharged into the free-water extracting chamber passage, means for conducting the emulsion upward from the flume for stratification above the extracted water, means for conducting liberated gases from the upwardly rising emulsion to the gas separating means, a weir box provided in the chamber for collecting the emulsion, a conduit communicating with the weir box and directing the emulsion into the scrubbing chamber, heating means in the scrubbing chamber, a plurality of vertically superimposed communicating trays disposed in the scrubbing chamber and communicating with the conduit, said trays arranged in an inverted position, means in the trays to provide a tortuous path of the emulsion flowing thereto, and means for carrying off the scrubbed oil from the uppermost of said trays.

2. In an oil emulsion treater comprising a horizontally disposed shell having a free-water extracting chamber, a flume having an open end in communication with the chamber, an influent mixture inlet communicating with the flume and disposed below the level of the emulsion mixture in the chamber, means for stratifying the emulsion mixture in the chamber, means conducting the stratified emulsion from the free-water chamber to a horizontal heated scrubbing chamber, a plurality of horizontally extended superimposed trays arranged in inverted position and disposed in the scrubbing chamber, said trays in communication with the conducting means, a plurality of axially disposed baffles provided in the trays to provide a tortuous path of the emulsion flowing therethrough, said inverted position of the trays preventing scrubbed water falling from a tray from contacting the flowing emulsion, and outlet means for the separated oil.

3. In an emulsion treating apparatus comprising a closed horizontally disposed shell, a flume mounted on the shell and communicating therewith, an emulsion inlet in the flume, an oil outlet in the shell, heating means in the shell to assist in breaking the emulsion, a primary chamber in the shell for extracting free-water from the emulsion, a separate horizontally disposed scrubbing chamber including the heating means, a plurality of superimposed trays adapted to extend in an elongated horizontal path and having their end portions disposed substantially perpendicular to the longitudinal axis of the shell, said trays arranged in an inverted position to provide a flat top portion and an open bottom portion, a plurality of baffles carried by the trays, means providing communication between the influent emulsion and the trays to discharge the emulsion through the trays in a tortuous path, outlet means for the separated clean oil, and outlet means for the precipitated water.

4. In an emulsion treating apparatus comprising a closed horizontally disposed shell, a flume mounted on the shell and communicating therewith, an emulsion inlet in the flume, and oil outlet in the shell, heating means in the shell to assist in breaking the emulsion, a primary chamber in the shell for extracting free-water from the emulsion, a separate horizontally disposed scrubbing chamber including the heating means, a plurality of superimposed trays adapted to extend in a substantially horizontal path and having their end portions disposed substantially perpendicular to the longitudinal axis of the shell, said trays arranged in an inverted position to provide a flat top portion and an open bottom portion, a plurality of baffles carried by the trays, means providing communication between the influent emulsion and the trays to direct the emulsion in a counterflowing path, means for separating the clean oil from the trays, outlet means for the precipitated water, and control means communicating with the precipitated water in the shell to regulated the oil-water interface therein.

5. In combination with an oil well emulsion treater, a horizontally disposed shell having a primary free-water extracting chamber, a horizontal scrubbing chamber baffled therefrom, an upright tank mounted on the shell and communicating with the interior thereof, a mist extractor disposed in the upper portion of the tank, an influent mixture inlet communicating with the tank at a point below the surface of the water in the extracting chamber, a circular perforated plate disposed adjacent the lower end of the tank providing for discharge of the influent upwardly therethrough for stratification above the extracted free-water, means for conducting liberated gases from the upwardly rising emulsion to the mist extractor, a weir box provided in the primary chamber permitting spilling of the emulsion thereinto, a conduit providing communication between the weir box and the scrubbing chamber, heating means in the scrubbing chamber, a plurality of superimposed communicating trays disposed in the scrubbing chamber and in communication with the conduit, said trays horizontally arranged to define end portions substantially perpendicular to the longitudinal axis of the shell, and arranged in an inverted position to provide a flat top portion and an open bottom portion, means in the trays to provide a counterflow of the emulsion flowing therethrough, said flat top portion precluding contact of the precipitated water with the incoming emulsion, means for carrying off the scrubbed oil, means for carrying off the liberated gases from the scrubbed oil, and means communicating with the precipitated water in the shell to control the oil-water interface therein.

6. In an oil emulsion treater comprising a horizontally disposed shell having a free-water extracting chamber, a flume having an open end in communication therewith, a mist extractor in the flume, an influent inlet disposed in the upper portion of the flume below the mist extractor to provide for discharge of gaseous vapors from the inlet mixture to the mist extractor, means conducting the stratified emulsion from the free-water chamber to a horizontal heated scrubbing chamber, a plurality of horizontally extended superimposed trays arranged in inverted position and disposed in a scrubbing chamber, said trays in communication with the conducting means, a plurality of axially disposed baffles provided in the trays to provide a counterflow of the emulsion flowing therethrough, said inverted position of the trays preventing scrubbed water falling from a tray from contacting the flowing emulsion, and outlet means for the separated oil.

SAMUEL A. WILSON.

References Cited in the file of this patent

UNITED STATES PATENTS

| Number | Name | Date |
|---|---|---|
| 1,648,558 | Meston et al. | Nov. 8, 1927 |
| 1,869,758 | Lungstras | Aug. 2, 1932 |
| 2,167,160 | Raymond | July 25, 1939 |
| 2,261,057 | Erwin | Oct. 28, 1941 |
| 2,297,297 | Walker | Sept. 29, 1942 |
| 2,384,222 | Walker | Sept. 4, 1945 |
| 2,457,959 | Walker | Jan. 4, 1949 |
| 2,601,904 | Erwin | July 1, 1952 |